US006669145B1

(12) United States Patent
Green (10) Patent No.: US 6,669,145 B1
(45) Date of Patent: Dec. 30, 2003

(54) APPARATUS, METHOD AND SYSTEM FOR FLUID-MOTION-POWERED MODULATION OF A RETROREFLECTOR FOR REMOTE POSITION SENSING

(75) Inventor: Samuel I. Green, St. Louis, MO (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 10/331,810

(22) Filed: Dec. 30, 2002

(51) Int. Cl.[7] .......................... G01C 3/00; B64D 39/00
(52) U.S. Cl. .................. 244/135 A; 356/5; 356/152; 356/139.03; 250/206.1; 250/206.2
(58) Field of Search .................. 244/135 R, 135 A, 244/161, 115, 116; 356/5, 152, 139.03, 141.5; 250/206.1, 206.2; 348/117; 359/291, 223, 292, 298, 846

(56) References Cited

U.S. PATENT DOCUMENTS

| 4,025,193 | A | 5/1977 | Pond et al. |
| 4,158,885 | A | 6/1979 | Neuberger |
| 5,493,392 | A | 2/1996 | Blackmon et al. |
| 5,530,650 | A | 6/1996 | Biferno et al. |
| 6,233,088 | B1 | 5/2001 | Roberson et al. |
| 6,392,222 | B1 | 5/2002 | Greenwood |
| 6,420,694 | B1 | 7/2002 | Greenwood |

OTHER PUBLICATIONS

Valase, Kimmett, Hughes, Gunman, Junkins; *Vision Based Sensor and Navigation System for Autonomous Aerial Refueling*; AIAA 1st Technical Conference and Workshop on Unmanned Aerospace Vehicles, Technolologies, and Operations (May 22, 2002); AIAA 2002–3441.

*Primary Examiner*—Galen L. Barefoot
(74) *Attorney, Agent, or Firm*—Alston & Bird LLP (57) ABSTRACT

A fluid-motion-powered modulated reflector apparatus is provided that modulates the frequency of a reflected radiation signal. Passing the apparatus through a fluid such as air causes rotational velocity of a chopping wheel or, in some instances, a polarizing filter rotatably connected to propeller blades. The radiation signal is modulated by the blocking effect of a chopping wheel or a fixed polarizing filter and a rotating polarizing filter. The apparatus also can include a frequency selector to control the rotational velocity of the chopping wheel or rotatable polarizing filter. A fluid-motion-powered modulated reflector system may include an array of fluid-motion-powered modulated reflectors, each differently modulated by a frequency selector to allow a position sensor, such as a duo-lateral photodiode position sensing detector, and position determining system, to locate and determine the position of each individual retroreflector simultaneously. This system can be used for aerial refueling of unmanned combat air vehicles.

39 Claims, 9 Drawing Sheets

APPARATUS, METHOD AND SYSTEM FOR FLUID-MOTION-POWERED MODULATION OF A RETROREFLECTOR FOR REMOTE POSITION SENSING

FIELD OF THE INVENTION

The present invention relates generally to radiation reflectors, and, more particularly, to frequency discrimination between multiple modulated reflectors for simultaneous remote position sensing, such as for in-flight refueling of aircraft.

BACKGROUND OF THE INVENTION

Retroreflectors are well-known devices in the field of electromagnetic and optical radiation. A retroreflector, such as a corner reflector or corner cube, made by arranging three reflecting surfaces at mutual 90 degree angles, is often used as a cooperative target for locating and ranging because its signal return decreases as $1/R^2$, where R is range, instead of $1/R^4$, the performance of a normal flat mirror. Retroreflectors receive radiation energy and reflect such energy back in the direction from which the radiation energy came. Without modification, a retroreflector will return the radiation energy with the same general characteristics of amplitude versus time behavior as the incident radiation. Methods of modulating the characteristics of the amplitude versustime behavior of reflective radiation signals have been developed using modulated retroreflectors in different applications.

Presently, any modulation of radiation signals reflected from a retroreflector is caused by changing some characteristic of the retroreflector to alter its performance. For example, U.S. Pat. No. 6,233,088 to Roberson et al. discloses modulating a radiation signal by deforming a reflecting surface of the retroreflector.

By example only, one application of modulated retroreflectors is in the field of in-flight aircraft refueling. Pilots in manned aircraft use visual cues to locate, approach, and station a receiving aircraft relative to a tanker aircraft, at which point personnel on the tanker manipulate a boom to mate with the proper receptacle on the refueling aircraft or the pilot of the receiving aircraft approaches and mates to a drogue trailing from the tanker. This type of in-flight refueling operation requires skilled pilots in both aircraft to position and orient the aircraft and either a skilled boom operator to control the position of the refueling boom relative to the receiving aircraft or a skilled pilot to control the position of the receiving aircraft relative to the drogue. Because refueling operations are manually controlled at least in part, the chance of pilot or operator error increases the potential for a collision between the two aircraft or between the receiving aircraft and the refueling boom or drogue. Automation of these processes for unmanned aircraft requires location of cueing features on the tanker or drogue so an unmanned aircraft can perform the same process of locating a tanker and positioning itself relative to the tanker so that a skilled operator on the tanker may guide the boom into the desired position or relative to the drogue.

Other prior art systems for in-flight refueling of aircraft use optical systems with multiple reflectors. Each reflector may be distinguished from another by the pattern of their placements. Another method to distinguish the position of each of several retroreflectors is modulation of each reflected radiation signal at a different frequency. The different frequencies of modulation of the reflected radiation signals allow a frequency selective position measuring system to separately interpret the information provided by each reflected radiation signal in order to obtain precise measurement of the position of each retroreflector and, thus, the orientation of the structure upon which the retroreflectors are mounted. Presently, systems for simultaneously measuring positions of several reference points use an imaging system to observe positions of an array of retroreflectors distinguished by placement in a characteristic pattern. An alternative prior art method is the use of a non-imaging position measuring sensor system such as a duo-lateral photodiode position sensor that separately measures the different frequencies of modulation of radiation signals using electrical modulation of sources such as a light emitting diodes. This method can be extended to an array of retroreflectors by using electrical modulation of corner reflectors with a deformable reflecting surface, each at a characteristic frequency.

Typically two methods are used for implementing cooperative remote sensing: modulated or continuous light sources in a known array on the target, or modulated or unmodulated retroreflectors in a known array on the target. Unmodulated sources emit continuous wave signals and reflectors reflect incident signals back to an imaging position-sensing radiation detector and position determining system, which could be a pilot's eyes or a video camera and image processor. Image sensors, such as video cameras, respond only to the intensity (and perhaps color) of light, as their frame rate is too slow to respond to modulation frequencies above a few hertz. Modulated sources and reflectors emit or reflect modulated signals back to non-imaging sensors. Non-imaging position sensors such as duo-lateral photodiodes have much faster speed of response, so they can measure the position of multiple sources if they are modulated at different frequencies so that the measurements can be separated based on frequency.

One prior art duo-lateral photodiode position sensor system uses light emitting diodes (LEDs), each emitting light modulated at different frequencies to enable a remote sensing device to measure the exact coordinate of each LED. However, using LEDs to create a coordinated source array requires electrical power and wiring to energize and modulate the emitted light of the LEDs. Another method of modulating a radiation signal is disclosed in U.S. Pat. No. 6,233,088 to Roberson et al. The Roberson method consists of selectively mechanically deforming at least a portion of a reflective surface of a reflector. As when using LEDs to produce a modulated radiation signal, the Roberson method, too, requires electrical power to produce a modulated reflected radiation signal. The necessity of a power source and the associated wiring to provide modulation for a remote sensing system can be a substantial disadvantage to implementing an automated remote sensing system for aerial refueling.

In order to reduce the risk of human life, unmanned air vehicles (UAV) have been employed and are being further developed for surveillance and smart weapon technology. An extension of an unmanned air vehicle is the use of such an aircraft for offensive and defensive combat strikes. The unmanned combat air vehicle (UCAV) was designed and is being further developed as a safe and affordable weapon system to expand the capabilities of an air defense and strike system. The goal of a successful UCAV design would provide the strength, features, and functionalities of a current strike fighter with limited human intervention by automating tasks that would have previously required human control. Ideally, a UCAV could perform all the tasks if not more tasks of a manned combat air vehicle, with limited or no human intervention required. For example, in order to be able to operate a UCAV during prolonged periods of time without landing, the vehicle would need to be refueled from a tanker aircraft. Thus it would be advantageous to design an automatic positioning system that is reliable enough to enable a UCAV to automatically position itself in relation to a tanker aircraft for refueling.

BRIEF SUMMARY OF THE INVENTION

A fluid-motion-powered modulated retroreflector is therefore provided to modulate radiation signals in a unique manner to permit each retroreflector in an array to be discriminated and individually located. Such fluid-motion-powered modulated retroreflectors include a chopping wheel or a pair of polarizing filters, or polarizers, that may modulate the reflected radiation and a propeller to rotate a chopping wheel or one of the polarizing filters. Motion of the propeller through a fluid such as air causes rotational velocity of the propeller and eliminates the need for an independent drive mechanism to power the modulation of a reflected radiation signal. The apparatus includes a frequency selector to control the rotational velocity of the propeller, such as by limiting the maximum rotational velocity of the propeller. Fluid-motion-powered modulation is an alternative to using an electrical drive mechanism to rotate a chopping wheel or a polarizing filter, modulating reflected radiation signals, or otherwise changing the properties of an illuminated retroreflector.

Previous methods of modulating a retroreflector typically require electrical power to energize the means of modulation. For some applications it is desirable that the means of modulation not require electrical power or control. Furthermore, an array of modulated retroreflectors, each having their own predetermined modulation frequency, is desirable for difficult remote sensing applications. With such an array of modulated retroreflectors, each retroreflector reflects incident continuous wave signals at a different predetermined frequency and a position sensor, such as a duo-lateral photodiode, can measure the position of each modulated retroreflector simultaneously.

One embodiment of the present invention uses a chopping wheel to modulate the reflected radiation signal. A second embodiment of the present invention employs a fixed polarizing filter in combination with a rotating polarizing filter. In a further embodiment of the present invention, each reflector in an array of reflectors can reflect radiation that is differently or uniquely modulated to allow a position-sensitive radiation detector, or position-sensing photodetector, and position determining system or device to locate and determine the position of each reflector.

In accordance with one advantageous embodiment of the present invention, a chopping wheel with attached propeller blades is mounted in front of a reflector. When the propeller blades pass through a fluid, the chopping wheel rotates in front of the reflector. As incident radiation signals are reflect from the reflector, the chopping wheel blocks a varying portion of the incident and reflected signals to impose an amplitude modulation onto the reflected radiation signal. A frequency selector controls the modulation of the radiation signal by limiting the maximum rate of rotational velocity of the propeller blades. The frequency selector may be a governor similar to a combustion engine speed control device, a clutch or slip style device, or any other system designed to control the speed of rotation by fixing an upper limit. This embodiment of the present invention might also include a shaft, passing through or around the center of the reflector or reflector assembly, to which the chopping wheel and frequency selector are mounted. The chopping wheel may include any number of apertures to modulate the radiation signals.

Generally, the present invention is effective in air for use with aircraft. Alternatively, the present invention can be employed in other fluids including water for use with submarines and boats. The fluid and relative motion of the propeller is generally such that the propeller rotates with sufficient rotational velocity to be limited by the frequency selector.

In accordance with further principles of the present invention, a receiving aircraft emits a single incident radiation source towards a tanker aircraft mounted with modulated retroreflectors at different positions. This particular application of the present invention offers airflow to power the modulation of the retroreflectors. The incident radiation source is reflected by each of the reflectors and differently modulated in each instance. A position-sensitive radiation detector on the receiving aircraft receives each of the differently modulated reflected signals. A position determining device or system processes the signals from the position-sensitive radiation detector and determines the relative position of each of the retroreflectors based on the signal frequency components of the differently modulated reflected signals from each electrode of the position-sensitive radiation detector. This information can be provided to a control mechanism to automatically pilot the receiving aircraft into a desired, relative position with the tanker aircraft. The modulated retroreflectors might be positioned in a predetermined array to provide position and orientation determination and enable an automated system. A particular benefit of the present invention is the ability to differently modulate a single incident radiation signal with an array of differently modulated retroreflector signals.

In accordance with another advantageous embodiment of the invention, a rotatable polarizing filter is located in front of the reflector and a fixed polarizing filter is mounted before or behind the rotatable polarizing filter and in front of the reflector. Propeller blades extend outwardly from the rotatable polarizing filter. When the propeller blades pass through a fluid, or a fluid passes over the propeller blades, the propeller blades and polarizing material rotate in front of or behind the fixed polarizing filter and in front of the reflector. As radiation signals are received and pass through the rotatable and fixed polarizing filters, the radiation signals are linearly polarized and attenuated or possibly blocked if the polarizing axes of the two polarizing filters are crossed. After being reflected, the polarized radiation signal passes back through the polarizing filters. The constant rotation of the rotatable polarizing filter prevents portions of the signal from returning to the source due to different polarization angles of the fixed and rotatable polarizing filters. This signal blockage produces a similar modulated radiation signal, as does the blocking by the chopping wheel in the previously described embodiment. Again, a frequency selector can control the modulation of the a amplitude of the radiation signal by limiting the maximum rate of rotational velocity of the rotatable polarizing filter. Although not required, the frequency selector can also control the rotational velocity of the propeller blades that generate the rotational velocity of the rotatable polarizing filter.

As will be recognized by persons of ordinary skill in the art, numerous variations of propellers can be employed to produce rotation by fluid flow in a modulated reflector. Any type of configuration or shape of device that intercepts fluid flow to provide rotation would be appropriate to use with a reflector to create a fluid-motion-powered modulated retroreflector, including a squirrel cage with blades or a helical screw with no blades at all. Also for example, several fins on a cylindrical or conical surface may provide similar rotation, as can propeller blades. All such devices are generally referred to in this application as propellers or propeller blades, even such a device as a helical screw which, although absent of conventional physical propeller blades, functions as a propeller or propeller blade for purposes of this invention.

Also, as will be recognized by persons of ordinary skill in the art, numerous variations of chopping wheels can be employed to modulate the radiation signal. Any type of configuration of discs or size and shape of apertures in the discs that provide signal modification of the associated electromagnetic radiation would be appropriate to use with the present invention. And either the first or second chopping wheel disc need to rotate. All such devices are generally referred to in this application as chopping wheels. Furthermore, a patterned reflective coating such as a glass beaded painted surface, an array of small corner reflectors, a reflective tape, or similar reflector material arranged as a second chopping wheel disc can replace a second, fixed chopping wheel disc and a separate retroreflector so long as either the patterned reflective array or the chopping wheel disc rotates with respect to the other.

It will be appreciated from the foregoing summary that the invention provides a new and improved fluid-motion-powered method to modulate radiation signals from a reflector. The invention is suitable for various reflective devices, particularly for aerial and submersible reflective devices. Specifically, the invention is suitable to assist with in-flight refueling of unmanned or manned aircraft. The invention can also be used to create displays for use in positioning aircraft or other vehicles, or possibly to automate the entire refueling process or to automatically mate aerial vehicles. Thus, the invention has a wide range of use and flexibility that stems from the basic concept of the invention and broad application of reflective devices.

Fluid-motion-powered modulation of the amplitude of radiation signals is possible by capturing and manipulating the rotation caused by fluid flow. In any application of the present invention, the disadvantages of prior art systems, particularly the requirement for electrical power, is eliminated. The preferred embodiments of the present invention increase the potential application of modulated reflectors for remote position sensing and measurement by eliminating the requirements of wiring and electrical power.

BRIEF DESCRIPTION OF THE DRAWINGS

Having thus described the invention in general terms, reference will now be made to the accompanying drawings, which are not necessarily drawn to scale, and wherein:

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

While a primary use of the present invention is in the field of in-flight refueling of aircraft, it will be appreciated from the following description that the invention is also useful for many types of remote position sensing.

Figure 1:
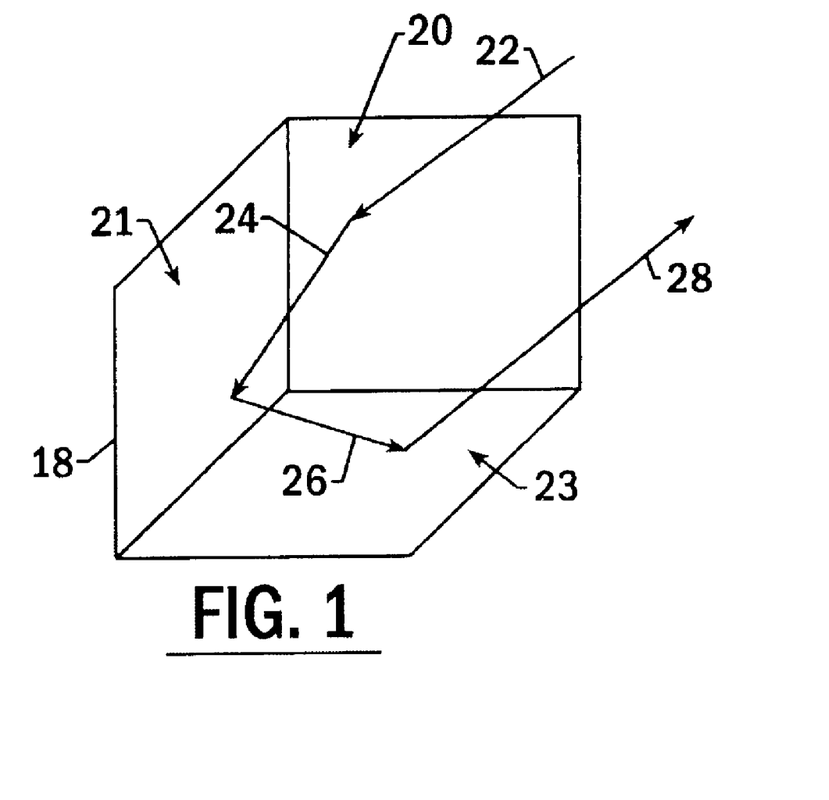
FIG. 1 is a perspective view of a corner cube reflector.

FIG. 1 illustrates a corner cube reflector 18 with internal reflective surfaces 20, 21, 23. An incident radiation signal 22 reflects off internal surface 20 of the corner cube reflector 18 to produce an internal reflection 24 which subsequently strikes a second surface 21 and produces internal reflection 26 which strikes a third surface 23 and results in reflected radiation signal 28 that is substantially parallel to and has the same general characteristics as incident radiation signal 22. The configuration of the corner-cube reflector 18 as shown in FIG. 1 may also be referred to as a retroreflector. As known to those skilled in the art, internal surfaces 20, 21, 23 can be any reflective surface and is generally mirrored to facilitate efficient reflection of incident light such as incident radiation signal 22. Such a combination will produce a combined reflected angle of almost exactly 180 degrees regardless of the incident angle of the radiation signal to produce a substantially parallel reflected radiation signal. Thus, an incident ray will be reflected almost exactly back to its source independent of relative angle within wide angular acceptance limits.

Figure 2:
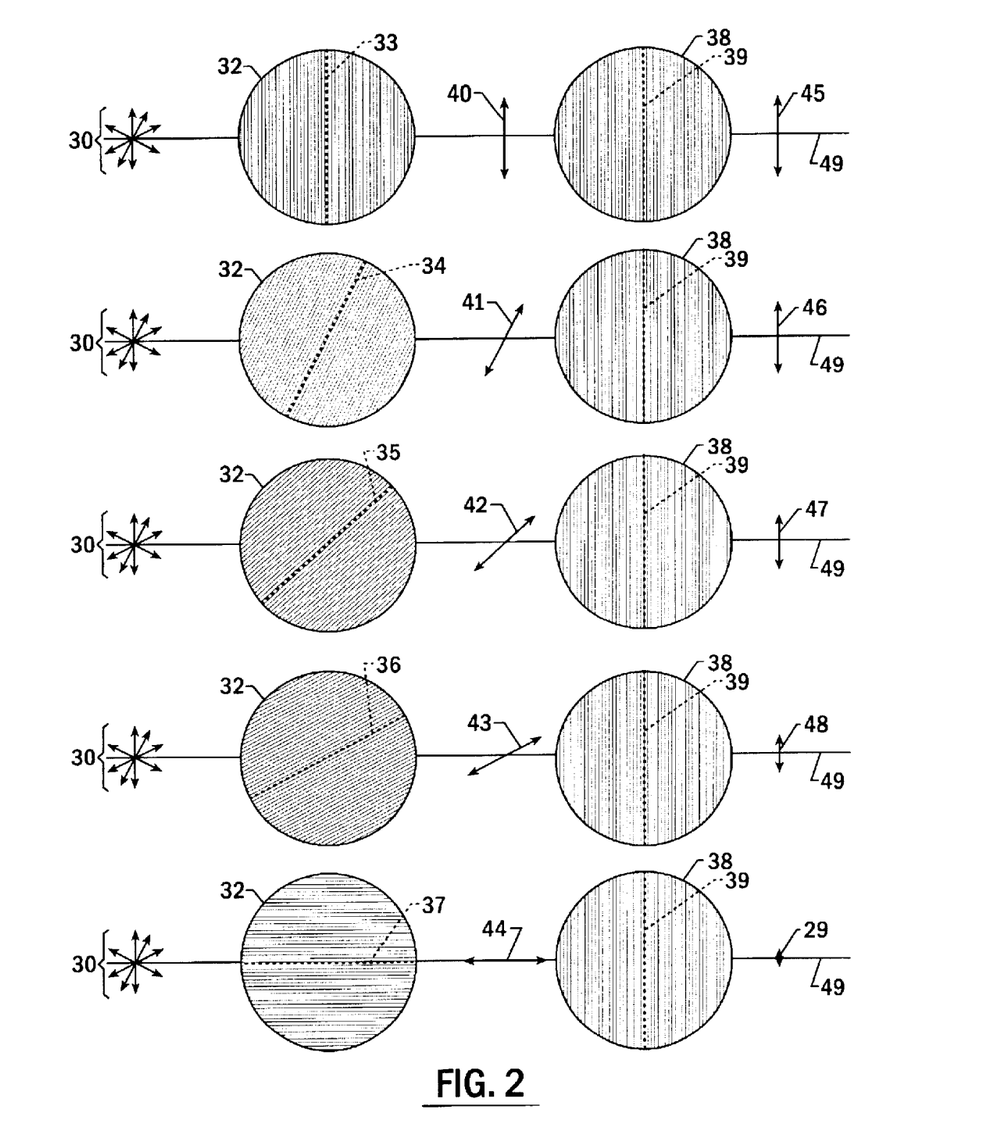
FIG. 2 is a pictorial diagram depicting linear polarization of a radiation signal passing through two polarizing filters at several different variations of relative polarization angles.

Also known to those skilled in the art will be the general process of polarization and the effect on incident radiation signals. FIG. 2 illustrates the effect of two polarizers upon an incident radiation signal 30 at several different variations of relative polarization angles between a first polarizer 32 and second polarizer 38. For example, FIG. 2 shows how a first polarizer 32 produces a linearly polarized radiation signal 41 by polarizing an incident radiation signal 30 along a first polarizing axis 34 and how a second polarizer 38 produces a resulting radiation signal 46 by polarizing a linearly polarized radiation signal 41 along a second polarizing axis 39. The effect of rotating a first polarizer 32 is to produce a modulated radiation signal as the net transmission varies between maximum and minimum twice per rotation; a quarter rotation of a first polarizer 32 is represented by the several polarizing axes 33, 34, 35, 36, 37 in FIG. 2. As known to those skilled in the art, rotating a second polarizer 38 would produce the same effect. When a first 32 and second 38 polarizer are rotated with polarizing axes aligned at 90 degrees relative to the other, the result is to block or minimize the incident radiation signal 30 as shown in FIG. 2 by a vector with no magnitude 29.

Figure 3:
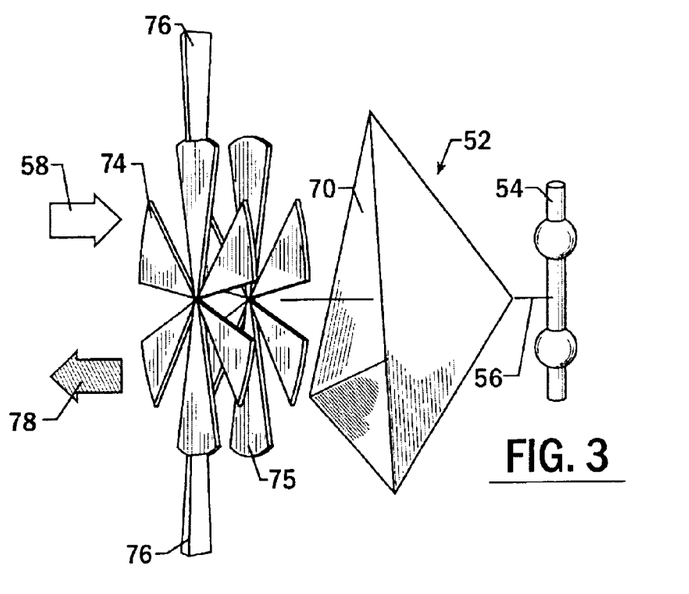
FIG. 3 is a perspective diagram of a fluid-motion-powered modulated retroreflector according to one embodiment of the present invention.

FIG. 3 is a cross-sectional diagram of a fluid-motion-powered modulated retroreflector apparatus that includes a chopping wheel according to one embodiment of the present invention. The apparatus includes a retroreflector 52 and a shaft 56 oriented such that the shaft 56 passes through the center of the retroreflector 52 and the face 70 of the retroreflector 52. A person of ordinary skill in the art would recognize that a shaft may be any rod-like or cylindrical structure to provide a body upon which elements may be affixed or from which elements may rotate. A cylindrical structure could surround the apparatus rather than passing through the center of the apparatus. The apparatus also includes a chopping wheel 74, 75 mounted along the shaft 56 and positioned in front of the retroreflector face 70. The chopping wheel consists of an aperture disc 75 and a similar rotatable disc 74. The apparatus includes propeller blades 76 connected to the rotatable disc of the chopping wheel 74. As the apparatus passes through a fluid, the propeller blades 76 cause rotation of the rotatable disc of the chopping wheel 74. The apparatus can also include a frequency selector 54, such as a governor, shown connected along the shaft 56, to control the maximum rotational velocity of the rotatable disc of the chopping wheel 74. When an incident radiation signal 58 passes through the rotational path of the chopping wheel 74, 75 and is reflected by the retroreflector 52 and passes again through the rotational path of the chopping wheel 74, 75, a resulting reflected radiation signal 78 is produced. The rotation of the chopping wheel 74, 75 through the path of the incident radiation signal 58 and reflected radiation signal 78 modulates the reflected signal 78 by blocking portions of the signals. The rotatable disc of the chopping wheel 74 is not rotated by an electrically-powered drive mechanism. Instead, the apparatus of the present invention takes advantage of the rotation caused by passage of fluid over the propeller blades 76, such as the passage of air over an aircraft, to modulate a radiation signal. Depending upon the passage of fluid over the propeller blades 76, the rotatable disc of the chopping wheel 74 can rotate at any rate up to a maximum rotational velocity permitted by the frequency selector 54, although the apparatus is generally configured so the rotatable disc of the chopping wheel 74 will rotate at the maximum rotational velocity permitted by the frequency selector 54. A person of ordinary skill in the art would also understand that either the first or second chopping wheel disc can rotate. Furthermore, a person of ordinary skill in the art would recognize that a patterned reflective coating such as a glass beaded painted surface, an array of small corner reflectors, a reflective tape, or similar reflector material arranged as a second chopping wheel disc can replace a second aperture disc and a separate retroreflector so long as either the patterned reflective array or the chopping wheel disc rotates with respect to the other. In such a case, a radiation signal passing through the chopping wheel would pass only through the first chopping wheel disc.

Figure 4:
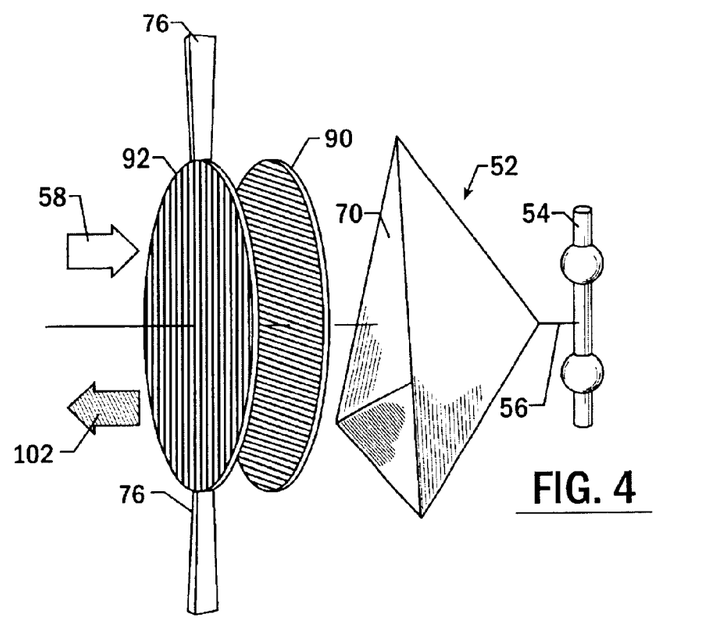
FIG. 4 is a cross-sectional diagram of a fluid-motion-powered modulated retroreflector that includes a fixed and a rotating polarizing filter according to one embodiment of the present invention.

Similar modulation occurs when using two polarizers, or polarizing filters, according to yet another embodiment of the present invention, one fixed 90 and one rotating 92 as shown in FIG. 4. When an apparatus uses two polarizers 90, 92, the incident radiation signal 58 is polarized by a rotating polarizer 92, analyzed by a second fixed polarizer 90, and reflected by the retroreflector 52 to produce a resultant reflected modulated radiation signal 102.

As shown in FIGS. 3 and 4, a fluid-motion-powered modulated retroreflector apparatus modulates a radiation signal according to the present invention without any drive mechanism other than the power due to motion through a fluid. Such modulation is caused either by the periodic blocking or chopping of a radiation signal by a chopping wheel, as shown in FIG. 3, or by the attenuation due to the varying angle of polarizers, as shown in FIG. 2. As a fluid-motion-powered modulated retroreflector apparatus passes through a fluid to cause rotation of a rotatable disc of a chopping wheel 74 or a rotatable polarizer 92, the frequency selector 54 restricts the rotational velocity of the rotatable disc of the chopping wheel 74 or rotatable polarizer 92 to a maximum value less than the unrestricted value. Normal operation and use lies within this rotational velocity-limited range so the frequency is predetermined. Where a plurality of fluid-motion-powered modulated retroreflectors are present, as discussed in detail below, the frequency selector 54 of each fluid-motion-powered modulated retroreflector apparatus can restrict the rotational velocity of the respective rotatable disc of a chopping wheel 74 or polarizer 92 to a different value from each of the other modulated retroreflector apparatuses, thereby permitting the modulated radiation from each retroreflector to be discriminated.

Figure 5:
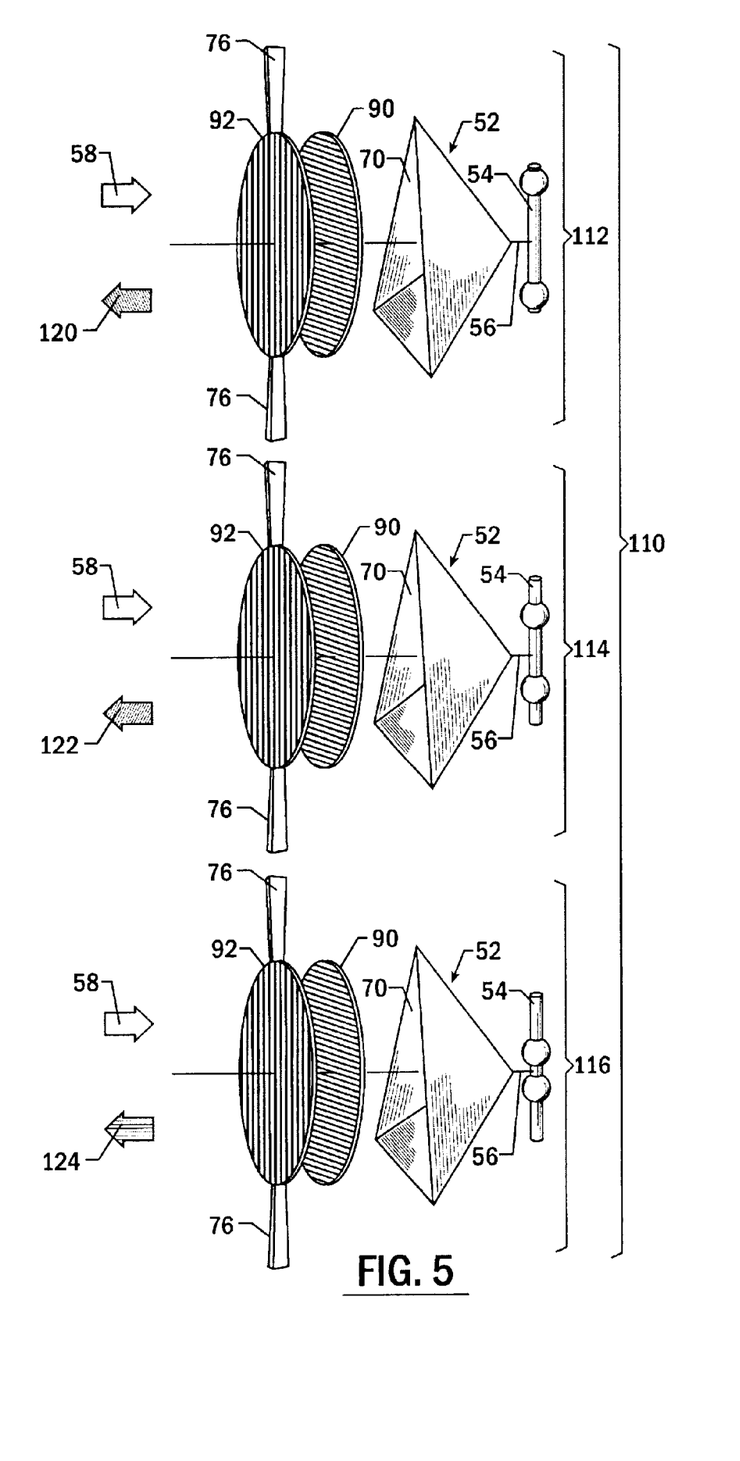
FIG. 5 is a side cross-sectional diagram of an array of passively modulated retroreflectors according to one embodiment of the present invention that depicts an incident radiation signal and various reflected radiation signals modulated at differing frequencies.

With reference to FIG. 5, a plurality of fluid-motion-powered modulated retroreflectors 112, 114, 116 can be used together to create a fluid-motion-powered modulated retroreflector array 110 according to the present invention. If only a single fluid-motion-powered modulated retroreflect is used, only one position can be detected. If a plurality of retroreflectors is used instead, a plurality of position locations can be detected to produce more information as to the location and orientation of the object carrying the fluid-motion-powered modulated retroreflector array. When several fluid-motion-powered modulated retroreflectors 112, 114, 116 are used according to the present invention, as shown in FIG. 5, each of the fluid-motion-powered modulated retroreflectors can produce a resulting reflected radiation signal 120, 122, 124 that is different from any other signal produced by another fluid-motion-powered modulated retroreflector in the array 110, i.e., each fluid-motion-powered modulated retroreflector apparatus modulates the radiation signal differently, such as by having governors that control different maximum rates of rotation. If each of the fluid-motion-powered modulated retroreflectors produced the same modulated radiation signal, a position detector would not be able to distinguish one retroreflected signal from another. When differently modulated radiation signals are present, a position determining system can separately process the signals of differing characteristic frequencies from a position sensitive radiation detector, such as a duo-lateral photodiode position sensor, to locate the position of each fluid-motion-powered modulated retroreflector. As known to those skilled in the art, a duo-lateral photodiode position sensor is a type of optoelectronic photodiode position sensing detector (PSD) that measures the position of incident radiation energy. A duo-lateral PSD determines the position by generating a linear comparison of the horizontal and vertical currents produced on the leads connected to the terminals of the PSD resistive layers. Other types of position sensing detectors can also be used according to the present invention.

Figure 6:
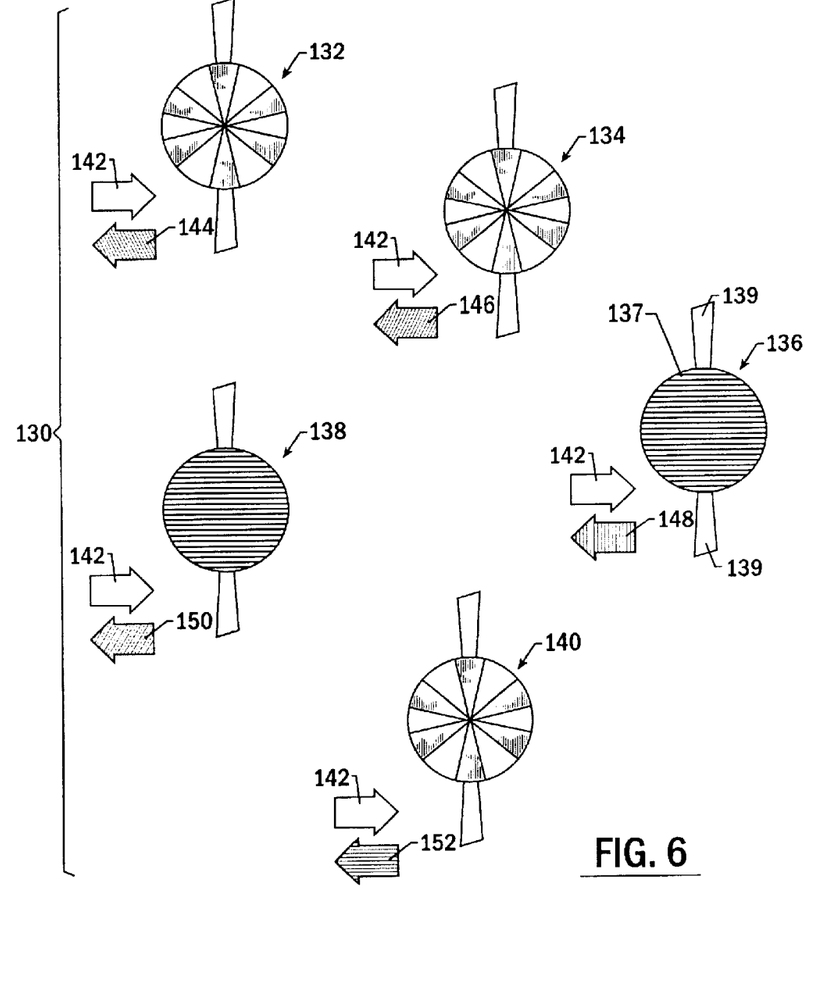
FIG. 6 is a frontal diagram of an array of fluid-motion-powered modulated retroreflectors that include rotating and a fixed chopping wheel discs and fluid-motion-powered modulated retroreflectors that include a rotating and a fixed polarizing filter according to embodiments of the present invention that depicts an incident radiation signal and various reflected radiation signals modulated at differing frequencies.

As shown in FIG. 6, a fluid-motion-powered modulated retroreflector array 130 according to the present invention can be composed of a plurality of fluid-motion-powered modulated retroreflectors 132, 134, 136, 138, 140 arranged in predetermined relative positions. As a person skilled in the art would recognize, using certain geometric arrangements of particular numbers of fluid-motion-powered modulated retroreflectors would provide more accurate position sensing and calculations. In order to employ the benefit of using a plurality of fluid-motion-powered modulated retroreflectors in an array, each of the fluid-motion-powered modulated retroreflectors can modulate the amplitude of an incident radiation signal 142 at a unique frequency to provide a unique resulting reflected modulated radiation signal 144, 146, 148, 150, 152, as shown in FIG. 6. The fluid-motion-powered modulated retroreflector array 130 shown in FIG. 6 uses both propeller-driven chopper wheel modulation 132, 134, 140 and propeller-driven polarization modulation 136, 138. As a person of ordinary skill in the art would recognize, any combination of different types of fluid-motion-powered modulated retroreflectors could provide an effective array. The mixed type combination shown in FIG. 6 is depicted primarily to convey that any type of fluid-motion-powered modulated reflector can be used in an array according to the present invention.

Figure 7:
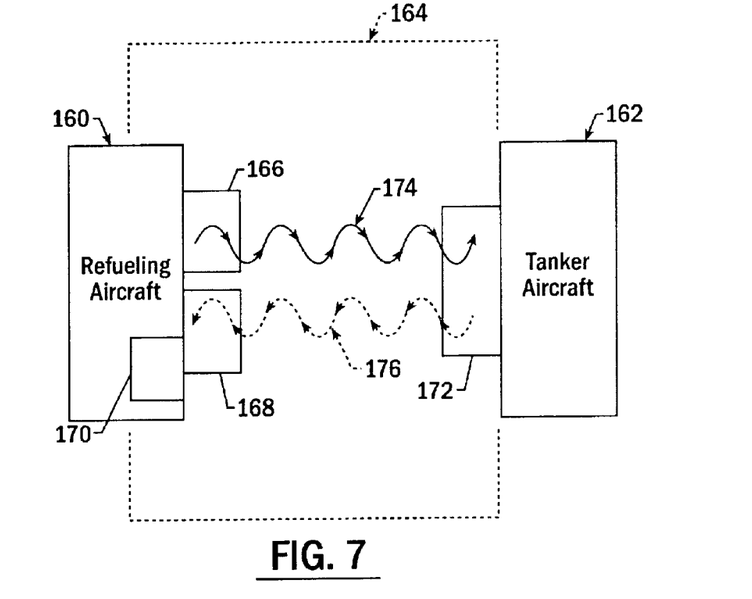
FIG. 7 is a block diagram of a fluid-motion-powered modulated retroreflector system for aerial refueling and aircraft mating according to one embodiment of the present invention.

FIG. 7 is a block diagram of a fluid-motion-powered modulated retroreflector system for aerial refueling and aircraft mating according to the present invention. While fluid-motion-powered modulated retroreflectors can be used for any type of position sensing, one particular use is in the field of in-flight refueling of aircraft. The system shown in FIG. 7 depicts a refueling aircraft sensing the position of the tanker aircraft, although a person of ordinary skill in the art would recognize that a tanker aircraft could employ position sensing to determine the position of the refueling aircraft or a refueling aircraft could employ position sensing to determine the position of a device affixed to a tanker aircraft or drogue. As shown in FIG. 7, the system includes a refueling aircraft 160 with a radiation source 166, a radiation detector 168 and a positioning system 170. According to the present invention, a radiation source 166 can include a laser, an LED or array of LEDs, or any other electromagnetic radiation source. A radiation detector 168 can include any position sensing detector (PSD) or optoelectronic photodiode, as previously discussed with reference to FIG. 5, such as a duo-lateral photodiode position sensor. A position determining system 170 typically can include a means to process the sensor signals and to interpret the position information received by the radiation detector 168 as known to those skilled in the art. A position determining system 170 can also use the position information to automatically control the refueling aircraft 160. According to the present invention, the system also includes at least one fluid-motion-powered modulated retroreflector 172 on the tanker aircraft 162 that cooperatively reflects some radiation from source 166, radiation detector 168, and positioning system 170 onboard the refueling aircraft 160 to comprise the fluid-motion-powered modulated retroreflector positioning system 164.

According to a system of the present invention shown in FIG. 7, the refueling aircraft radiation source 166 produces an incident radiation signal 174 that is propagated to the fluid-motion-powered modulated retroreflector 172 that is attached at a predetermined position on the tanker aircraft 162. Fluid-motion-powered modulated retroreflectors can alternatively be attached to a refueling receptacle of a refueling aircraft or a refueling drogue descending from a tanker aircraft. The incident radiation signal 174 is modulated and reflected by the fluid-motion-powered modulated retroreflector 172 to produce a reflected modulated radiation signal 176 that is returned to the refueling aircraft for receipt by the radiation detector 168. The position determining system 170 uses the relative position information detected by the radiation detector 168 to provide a portion of the data need for automatic control of the refueling aircraft 160. As previously mentioned, a person of ordinary skill in the art would recognize that the system shown in FIG. 7 could be used in the reverse order beginning with a radiation source on the tanker aircraft 162 to sense the position of a refueling aircraft 160 or a refueling receptacle on a refueling aircraft. This reverse order of the system would enable a tanker aircraft or a probe on the tanker aircraft to engage a refueling receptacle on the refueling aircraft 160.

Figure 8:
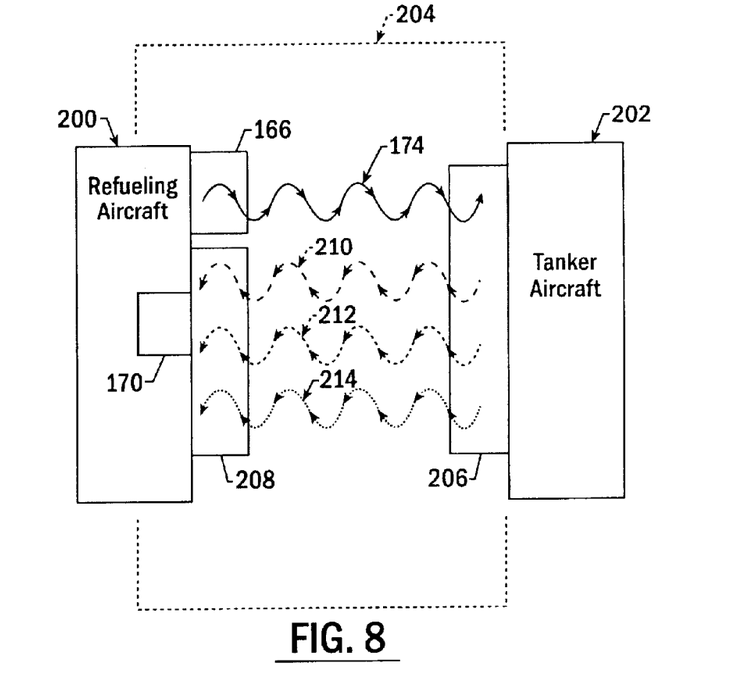
FIG. 8 is a block diagram of a fluid-motion-powered modulated retroreflector array system for aerial refueling and aircraft mating according to one embodiment of the present invention.

FIG. 8 is a block diagram of a fluid-motion-powered modulated retroreflector array system according to the present invention for mating aircraft for aerial refueling. As shown, a refueling aircraft 200 and a tanker aircraft 202 employ a fluid-motion-powered modulated retroreflector array system 204 to provide position sensing of the tanker aircraft 202 or a device located thereon. Unlike FIG. 7 that includes just one fluid-motion-powered modulated retroreflector 172 on the tanker aircraft 162, FIG. 8 includes a plurality of fluid-motion-powered modulated retroreflectors to create an array 206 on the tanker aircraft 202. The modulated retroreflector array 206 receives an incident radiation signal 174 and reflects radiation signals 210, 212, 214 that have been differently modulated according to the present invention. The radiation detector 208 and position determining system 170 located on the refueling aircraft 200 are able to distinguish between each of the fluid-motion-powered modulated retroreflectors in the array 206 on the tanker aircraft 202 or device connected thereon.

Figure 9:
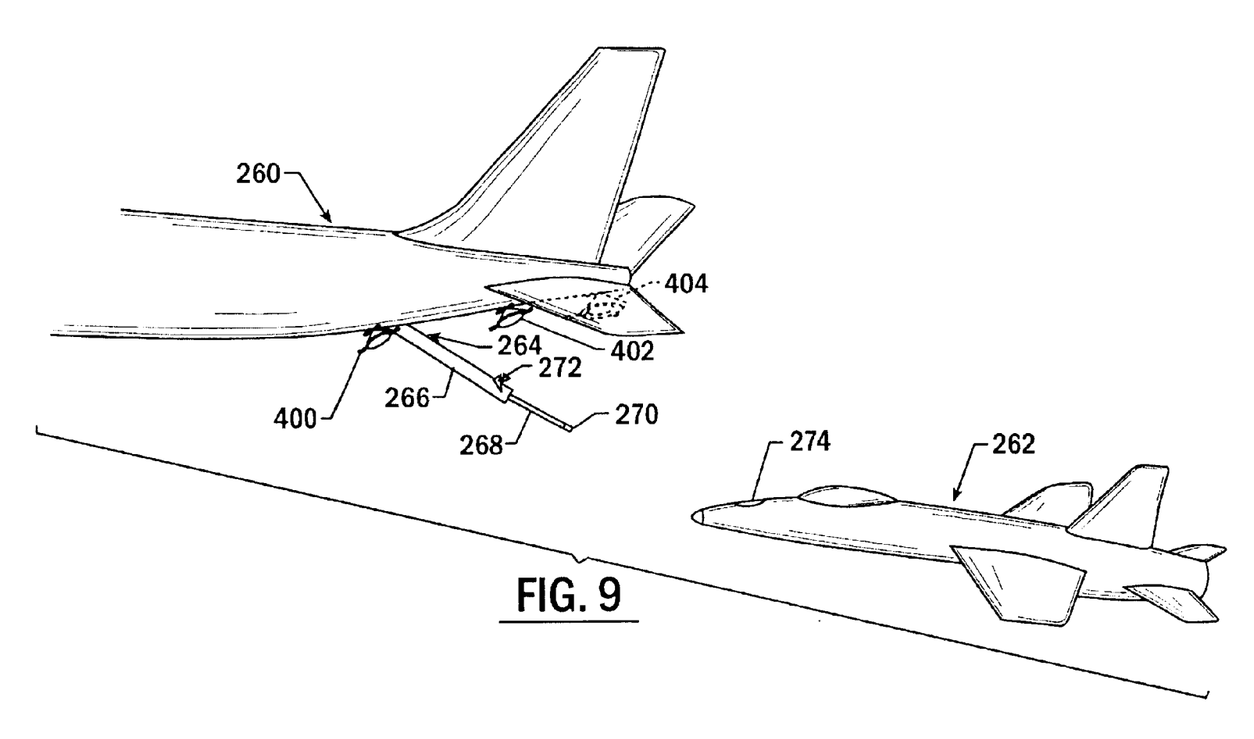
FIG. 9 is a side pictorial view of a tanker aircraft with a boom and probe in the process of engaging a refueling receptacle of a receiving aircraft employing the use of modulated retroreflectors.

FIG. 9 is a side pictorial view of a tanker aircraft 260 with a boom 266 and probe 268 in the process of engaging a refueling receptacle 274 of a receiving aircraft 262. The refueling aircraft 262 locates and approaches the tanker aircraft 260 and holds in a position behind and below the tanker aircraft 260. By employing fluid-motion-powered modulated retroreflectors 400, 402, 404 positioned on the tanker aircraft 260, the refueling aircraft 262 can automatically locate and approach the tanker aircraft 260 and hold a refueling position with respect to the tanker aircraft 260 according to the present invention. During aerial refueling of an aircraft, a boom operator controls the elevation and horizontal location of the refueling boom 266 in part using refueling ailerons 272. In addition the boom operator would control the extension of a probe 268 from the end of the boom 266 to engage the nozzle 270 with the refueling receptacle 274 on the refueling aircraft 262.

Figure 10:
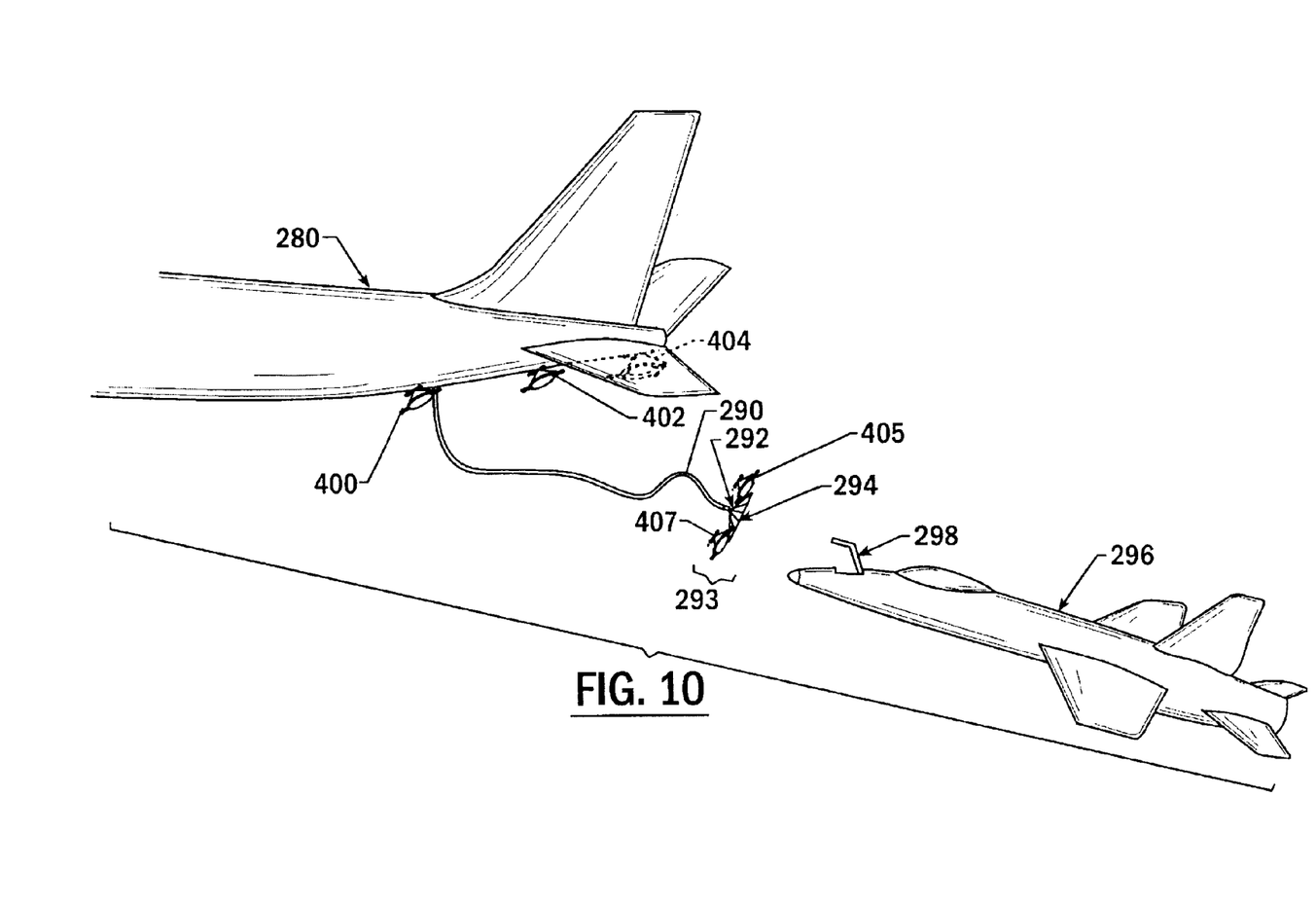
FIG. 10 is a side pictorial view of a tanker aircraft with a drogue in the process of connecting with a refueling aircraft employing the use of fluid-motion-powered modulated retroreflectors.

A similar aerial refueling method is depicted in FIG. 10 as a side pictorial view of a tanker aircraft 280 with a hose 290 and drogue 293 in the process of connecting with a refueling aircraft probe 298. The refueling aircraft 296 is guided into position such that the refueling probe 298 can engage the refueling drogue 293. The drogue 293 is a funnel-like basket composed of a meshwork cone 292 that allow a refueling probe 298 to engage the center of the refueling drogue 293 through the opening of the drogue 294. By employing fluid-motion-powered modulated retroreflectors 400, 402, 404 positioned on the tanker aircraft 280 and fluid motion powered modulated retroreflectors 405, 407 positioned on the drogue 293 according to the present invention, the refueling aircraft 296 can automatically guide itself into a refueling position to engage the drogue 293 and hold that position behind and below the tanker aircraft 280. To improve the accuracy and ability of the refueling aircraft 296 to automatically engage the drogue 293, additional fluid-motion-powered modulated retroreflectors can be positioned on the drogue 293 as shown in FIG. 11.

Figure 11:
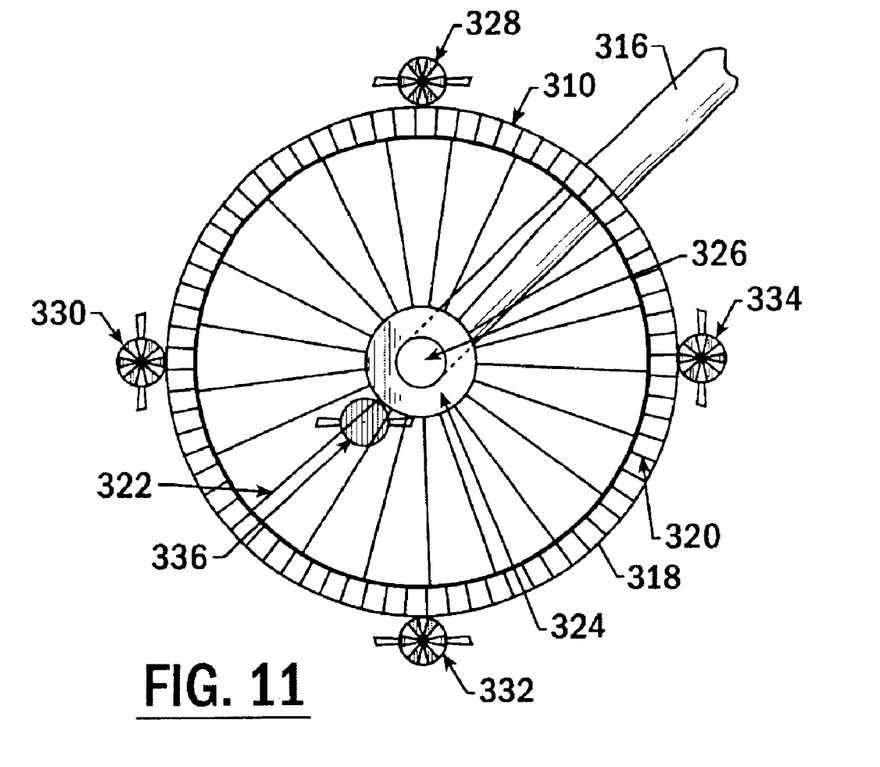
FIG. 11 is a front pictorial view of a refueling drogue employing fluid-motion-powered modulated retroreflectors.

FIG. 11 is a front pictorial view of a refueling drogue 310 employing fluid-motion-powered modulated retroreflectors 328, 330, 332, 334, 336 according to the present invention. The drogue is connected to a tanker aircraft by a refueling hose 316 that is connected to the refueling drogue 310 at the center and rear of the drogue 326. A refueling drogue can also include a collar 324 that helps to guide a probe on a refueling aircraft into the center of the refueling drogue 326. The meshwork cone 322 provides a refueling probe with the ability to slide down into the collar 324 and engage the opening of the refueling drogue 326. A rim 318 of a refueling drogue 310 will often include resistance devices 320 to deflect the fluid, normally air, through which the refueling drogue 310 is being pulled by the refueling hose 316 and tanker aircraft. The deflection of air causes the refueling drogue 310 to extend outwardly behind the tanker aircraft and helps to maintain a relatively steady position.

Each of the fluid-motion-powered modulated retroreflectors as shown in FIG. 11 is located either outside 328, 330, 332, 334 or behind 336 the refueling drogue 310 to prevent interference with a refueling probe as it engages the refueling drogue 310. According to the present invention, any predetermined arrangement for the positions of fluid-motion-powered modulated retroreflectors on the refueling drogue 310 would provide a refueling aircraft with the ability to locate a refueling probe into the collar 324 and center 326 of the refueling drogue 310. Furthermore, any combination or type of fluid-motion-powered modulated retroreflectors would be appropriate; shown in FIG. 11 are four fluid-motion-powered modulated retroreflectors employing chopping wheel modulation 328, 330, 332, 334 and one fluid-motion-powered modulated retroreflector employing polarization modulation 336.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A fluid-motion-powered modulated reflector apparatus comprising:
   a reflector for reflecting at least a portion of a radiation signal incident thereon;
   a chopping wheel disposed between a source of the radiation signal and said reflector; and
   a propeller that rotates in response to the passage of fluid thereover, connected to said chopping wheel to facilitate rotation thereof.

2. The apparatus of claim 1, wherein said reflector comprises a retroreflector.

3. The apparatus of claim 1, wherein said reflector comprises a corner-cube retroreflector.

4. The apparatus of claim 1, wherein said reflector is an array of retroreflectors, a reflective tape, or a reflective coating.

5. The apparatus of claim 1, further comprising a shaft to which said chopping wheel is mounted.

6. The apparatus of claim 1, wherein said fluid is air.

7. The apparatus of claim 1, further comprising a frequency selector to control the speed of rotation of said chopping wheel such that the radiation signal is modulated by said chopping wheel in accordance with the speed of rotation of said chopping wheel.

8. The apparatus of claim 7, wherein said frequency selector comprises a governor.

9. A method of modulating a radiation signal with a chopping wheel having a propeller connected thereto, comprising the steps of:
   passing said propeller through a fluid to cause rotation of said chopping wheel;
   controlling an angular velocity of said chopping wheel;
   propagating at least a portion of an incident radiation signal through said chopping wheel; and
   reflecting at least a portion of the incident radiation signal to produce a reflected radiation signal; and
   propagating the reflected radiation signal through said chopping wheel.

10. The method of claim 9, wherein controlling the angular velocity of said chopping wheel comprises limiting a maximum rotational velocity of said chopping wheel.

11. A system for determining relative positions of first and second in-flight objects, comprising:
    a source of radiation carried by said first object;
    at least one fluid-motion-powered modulated reflector, mounted on said second object for reflecting a radiation signal, wherein said fluid-motion-powered modulated reflector comprises:
        a reflector for reflecting at least a portion of a radiation signal incident thereon;
        a chopping wheel disposed between a source of the radiation signal and said reflector; and
        a propeller that rotates in response to the passage of fluid thereover, connected to said chopping wheel to facilitate rotation thereof; and
    a detector, mounted on said first object, to receive the reflected radiation signal.

12. The system of claim 11, wherein said detector is a radiation detector.

13. The system of claim 11, further comprising a position determining system coupled to said detector.

14. The system of claim 11, wherein said fluid-motion-powered modulated reflector further comprises a frequency selector to control the speed of rotation of said chopping wheel such that the radiation signal is modulated by said chopping wheel in accordance with the speed of rotation of said chopping wheel.

15. The system of claim 11, comprising a plurality of fluid-motion-powered modulated reflectors.

16. The system of claim 15, wherein said frequency selector of each fluid-motion-powered modulated reflector controls the speed of rotation of said chopping wheel such that the radiation signal is modulated by said chopping wheel in accordance with the speed of rotation of said chopping wheel.

17. The system of claim 15, wherein said reflectors are positioned in a predetermined array and predisposed in a direction to reflect the radiation signals.

18. The system of claim 17, wherein each frequency selector controls the speed of rotation of said chopping wheel such that the radiation signal is modulated by said chopping wheel in accordance with the speed of rotation of said chopping wheel to be predetermined and different from any other reflected radiation signal modulated in said array.

19. The system of claim 11, wherein said first object is a refueling aircraft and said second object is a tanker aircraft.

20. The system of claim 11, wherein said first object is an unmanned combat air vehicle.

21. A fluid-motion-powered modulated reflector apparatus comprising:

a reflector for reflecting at least a portion of a radiation signal incident thereon;
 a rotatable polarizing filter disposed between a source of the radiation signal and said reflector;
 a propeller that rotates in response to the passage of fluid thereover connected to said rotatable polarizing filter to facilitate rotation therewith; and
 a fixed polarizing filter covering the reflective face of said reflector and disposed between said rotatable polarizing filter and said reflector or disposed in front of said rotatable polarizing filter and said reflector.

22. The apparatus of claim 21, further comprising a frequency selector to control the speed of rotation of said propeller such that the radiation signal is modulated by said rotatable polarizing filter in accordance with the speed of rotation of said propeller.

23. The apparatus of claim 21, wherein said reflector is a retroreflector.

24. The apparatus of claim 21, wherein said reflector is a corner-cube retroreflector.

25. The apparatus of claim 21, wherein said reflector is an array of retroreflectors, a reflective tape, or a reflective coating.

26. The apparatus of claim 21, further comprising a shaft to which said rotatable polarizing filter and said frequency selector are mounted.

27. The apparatus of claim 21, wherein said frequency selector is a governor.

28. A method of modulating a radiation signal with a rotatable polarizing filter having a propeller connected thereto, comprising the steps of:

passing said propeller through a fluid to cause rotation of said rotatable polarizing filter;
 controlling an angular velocity of said polarizing filter;
 propagating an incident radiation signal through said rotatable polarizing filter and a fixed polarizing filter such that the radiation signal is polarized;
 reflecting at least a portion of the radiation signal to produce a reflected radiation signal; and
 propagating the reflected radiation signal through said rotatable polarizing filter and said fixed polarizing filter.

29. The method of claim 28, wherein controlling the angular velocity of said rotatable polarizing filter comprises limiting a maximum angular velocity of said rotatable polarizing filter.

30. A system for determining relative positions of first and second in-flight objects, comprising:

a source of radiation carried by said first object;
 at least one fluid-motion-powered modulated reflector, mounted on said second object for reflecting a radiation signal, wherein said fluid-motion-powered modulated reflector comprises:
  a reflector for reflecting at least a portion of the radiation signal incident thereon;
  a rotatable polarizing filter disposed between a source of the radiation signal and said reflector;
  a fixed polarizing filter covering the reflective face of said reflector and disposed between said rotatable polarizing filter and said reflector or disposed in front of said rotatable polarizing filter and said reflector; and
  a propeller that rotates in response to the passage of fluid thereover connected to said rotatable polarizing filter to facilitate rotation therewith; and
 a detector, mounted on said first object, to receive the reflected radiation signal.

31. The system of claim 30, wherein said detector is a radiation detector.

32. The system of claim 30, further comprising a position determining system coupled to said detector.

33. The system of claim 30, wherein said fluid-motion-powered modulated reflector further comprises a frequency selector to control the speed of rotation of said polarizing filter such that the radiation signal is modulated by said rotatable polarizing filter in accordance with the speed of rotation of said rotatable polarizing filter.

34. The system of claim 30, comprising a plurality of fluid-motion-powered modulated reflectors.

35. The system of claim 34, wherein said frequency selector of each fluid-motion-powered modulated reflector controls the speed of rotation of said rotatable polarizing filter such that the radiation signal is modulated by said rotatable polarizing filter in accordance with the speed of rotation of said rotatable polarizing filter.

36. The system of claim 34, wherein said reflectors are positioned in a predetermined array and predisposed to reflect the radiation signal.

37. The system of claim 36, wherein said frequency selector of each fluid-motion-powered modulated reflector controls the speed of rotation of said rotatable polarizing filter such that the radiation signal is modulated by said rotatable polarizing filter in accordance with the speed of rotation of said rotatable polarizing filter to be different from any other reflected radiation signal modulated in said array.

38. The system of claim 30, wherein said first object is a refueling aircraft and said second object is a tanker aircraft.

39. The system of claim 30, wherein said first object is an unmanned combat air vehicle.

* * * * *